United States Patent Office 3,475,442
Patented Oct. 28, 1969

3,475,442
BRAZING ALLOY BINDER
Edward R. Roeder, Canoga Park, Calif., assignor to North American Rockwell Corporation, a corporation of Delaware
No Drawing. Filed Dec. 8, 1965, Ser. No. 512,509
Int. Cl. B23k 35/36, 35/32
U.S. Cl. 260—29.6
2 Claims

ABSTRACT OF THE DISCLOSURE

A brazing alloy binder comprising polybutene, ethylene glycol and derivatives thereof, water and an acrylic resin.

---

This invention relates to a binder for brazing alloy compositions in powder form. More particularly, the invention relates to a novel binder utilizable for extrudable brazing alloy pastes.

The invention was made in the performance of work under a NASA contract and is subject to the provisions of the National Aeronautics and Space Act of 1958, Public Law 85–568 (72 Stat. 426; 42 U.S.C. 2451), as amended.

Brazing alloy powders in order to be adequately applied to most surfaces must be mixed with a suitable binder material which serves to adhere the metal alloy particles together into a cohesive mass so that it can be applied to the metal surface which is to be brazed. Thus various binder compositions have been formulated for particular use with brazing alloys. In most applications the consistency of the paste formed with the binder for the brazing alloy is not particularly critical as long as it sufficiently adheres to the metal surface to which it is applied. However, to date the paste formed utilizing conventional binders is not satisfactory for applications where the brazing alloy is to be extruded from caulking guns or hypodermic syringes into small areas. The use of extrusion from caulking guns or hypodermic syringes affords a means for rapidly applying and precisely metering the required amount of the metal powders in the brazing. The prior techniques of application not utilizing closely controlled metering were wasteful and usually provided an excess of material. Additionally, when expensive metals are used in the brazing alloy, the use of carefully controlled metering means to conserve the material is obviously desirable.

In attempting to utilize prior brazing paste having conventional binders therein with the extrusion means such as a caulking gun or hypodermic needle several problems are encountered. With some materials the paste could not be easily gunned, that is, it could not be readily forced through the end of the caulking gun or needle of the hypodermic syringe. An additional factor in extrudable brazing pastes is that they possess a long shelf life when stored in the extruding guns. It is important that the paste will not clog or separate when so stored in the gun to prevent ultimate extrusion therefrom. Once again when precious metals are involved, the cost factor makes it important that the material is not wasted by deterioration or clogging.

Thus it is an object of this invention to provide a binder for brazing alloys which will serve to form an extrudable paste.

Another object of this invention is to provide a novel binder for brazing alloy compositions which will provide an extrudable paste that can be easily utilized in extruding means.

A still further object of this invention is to provide a novel brazing alloy binder which will provide an extrudable paste that has a long shelf life in the extruding means.

Still one further object of this invention is to provide a novel brazing alloy binder composition which in addition to possessing properties useful for extrudable paste provides excellent brazing paste qualities.

The above and other objects of the invention are accomplished by the binder composition of the invention which is comprised basically of polybutene as the main constituent. Additionally, the components of the binder include ethylene glycol, water, and acrylic solution. This particular composition in addition to possessing the excellent properties necessary for extrusion has excellent slump resistance at room temperature and provides superior adhesion to metallic surfaces. The binder when mixed with the alloy to form a paste is permanently plastic. It also provides excellent alloy retention during the brazing cycle. The binder is not reactive with the brazing alloys and most commonly used base metal materials. Another important advantage of this particular binder is that it leaves no carbonaceous residue or ash after brazing.

More particularly, the binder of the invention is comprised from 85–91 volume percent polybutene, 3–5 volume percent of either ethylene glycol or ethylene glycol monomethyl, 5–10 volume percent water, and 1.25–2.50 volume percent solid acrylic resin dissolved in a suitable solvent such as toluol. The solids should be present in the solution to provide from .5 to 1 volume percent acrylic in the total binder composition. Polybutene is a term that relates to polybutylenes and covers the polymer of isobutene of varying molecular weights. An example of a particular one is a polybutylene that has a viscosity at 100° F. of 40,000 SSU. Generally, the polybutylenes used in the invention will generally have a viscosity at 100° F. within the range of 35,000 to 45,000 SSU. Polybutylene is chemically inert and permanently fluid. It is incapable of solidification and provides for extrudability of the material, adhesive quality and adds to its long shelf life. Advantages of its use in the composition also relate to the fact that it is not carbonizing where preplaced under brazing atmospheres of hydrogen or argon. It readily volatilizes at higher temperatures and can be purged out of the brazing muffles. The ethylene glycol or its monomethyl ether serves to provide an emulsion of the polybutene. It also allows for bleeding to provide a stiffer mixture after application, that is, liquation or running of the liquid glycol out of the extruded paste. The water component in the binder composition permits a slow evaporation to provide for a stiffer consistency after application. It also assists in uniform distribution of the powder particles throughout the emulsion formed. The acrylic resin is a primary adhesive for the brazed alloy. It is an old and well-known material used for binding such brazing alloy powders. Previously, however, its use has been in rapidly drying solutions of volatile solvents applied in slurry, spray or other uncontrolled saturation of powders. It has never been used in extrudable pastes such as presently contemplated. The acrylic resin serves to provide maximum alloy retention and slump resistance. Through its use the alloy is retained at elevated temperatures until the sintering takes place. The acrylic resin tends to leave a carbonaceous residue during heating when used in excess under very dry inert brazing conditions. Thus, a minimal amount of the material is used in the binder composition of the invention. The small amount of carbonaceous material that would then be formed during brazing is reacted by residual trace moisture in the dry brazing atmosphere so that it is not apparent at the end of the brazing period. The acrylic resin is generally available in a solution so that it can be mixed with other liquid ingredients. Toluol is merely one of the carriers used for forming such solutions. An example of the acrylic resin is Acryloid resin made by Rohm & Haas which comprises the lower copolymers of the esters of acrylic and methacrylic acid.

The binder of the invention is relatively easy to prepare. The preparation is generally carried out preferably as described below. First, the acrylic resin solution is mixed thoroughly with the ethylene glycol monomethylether by stirring in a suitable container of glass or stainless steel for production purposes. The mixture formed of the acrylic and ethylene glycol is then added to the polybutene and thoroughly mixed. Finally, the distilled water is added to the mixture and once again stirring occurs until the ingredients are well mixed. The ingredients are mixed to provide freedom from segregation lumps, resin stringers, or nondispersed particles. Each of the constituents is added in small increments during which vigorous agitation of stirring occurs. The completely mixed binder has a creamy white appearance when all of the constituents are uniformly dispersed. It is believed the invention will be better understood from the following detailed examples.

EXAMPLE I

A 300 milliliter batch of the binder of the invention was prepared. The mixing of the binder components transpired in a glass container. A stainless steel spatula was used to stir the materials. A solution of 40 weight percent solid acrylic resin in toluol was used. This solution was Acryloid resin solution, type B-72, made by Rohm & Haas Co. 3.75 ml. of the solution of the acrylic and toluol was then thoroughly mixed with 9 ml. of ethylene glycol monomethyl ether. After the two ingredients were thoroughly mixed they were added to 272.25 ml. of polybutene in small increments. Once again, thorough stirring and mixing occurred. Finally, 15 ml. of water was added to the mixed solution in small increments. Mixing continued until the binder composition was creamy white in appearance and all constituents appeared to be uniformly dispersed. When the above steps are repeated utilizing the components within the ranges previously recited, binder compositions of similar characteristics are obtained.

EXAMPLE II

The amount of the binder used with the brazing alloy powder is determined by a particular test as follows: In a graduate 10 ml. of a thinner is measured. The thinner is conventional mineral spirits. To the 10 ml. is added 10 ml. of bulk volume of a premeasured brazing alloy powder. The powder is then allowed to settle in the graduate. The liquid level is subtracted from 20 to determine the void in the powder. The void is then multiplied in ml. by a density factor of 8 to determine the weight in grams of the binder required for 100 ml. bulk volume of the alloy powder. The method is applicable to any of the alloy powders utilized meeting particle configuration requirements. After mixing the binder with the powder according to the amount determined from the above test, a mineral spirit or other similar thinner can be added to adjust the viscosity of the blended paste to provide a cone penetrometer worked penetration of 220-225 tenths of a milliliter per ASTM D217. If too much thinner is added, evaporation is required to restore the proper viscosity.

Specified dry flux powders may be incorporated into the dry brazing alloys prior to mixing into the brazing alloy paste utilizing the binder of the invention. The determination of the amount of the binder required shall be made utilizing a thoroughly blended mixture of the dry brazing alloy powder and dry flux powder, in accordance with the method set forth above. As indicated, the binder is applicable to virtually any alloy powder composition utilized for brazing applications provided particle configuration is suitable. Examples of such alloy compositions include 82 percent Au-18 percent Ni; 90 percent Ag-10 percent Pd; 62 percent Cu-35 percent Au-3 percent Ni; 90 percent Ag-5 percent Pd-4 percent Cu-1 percent Ni; 5 percent Si-2.9 percent B-7 percent Cr-3 percent Fe-C .06 percent max.-balance Ni; and 19 percent Cr-10 percent Si-balance Ni. Also any of the above compositions including additions of commercially available paste flux preparations and also flux powder additions such as cryolite powder are contemplated. Following are examples of specific brazing pastes made in accord with the invention:

EXAMPLE III 23.9 oz. of Premabraze 901 fine mesh powder made by Handy & Harmon which is an alloy of 90 percent silver and 10 percent paladium was utilized to form the paste. This dry alloy powder had a volume of 113 ml. and a weight of 741 grams. The void in the powder was determined to be 4 ml./10 ml. powder. This was determined in accord with the test set forth in Example II. Utilizing a factor of .75 as compared to .8 in Example II, the rate of the binder composition made in Example I was determined to be 33.9 grams. The void can be multiplied reasonably by a density factor varying from 7 to 8.5 to obtain a penetrometer penetration of 250 mm. A thinner volume utilizing a mineral spirits type of thinner in the amount of 7 ml. was added to the paste. The thinner can be many types of hydrocarbon solvents which do not evaporate rapidly and do not leave an appreciable residue upon evaporation. The resultant paste from the thoroughly mixed powder binder and thinner was extrudable, had no slump, and went through a number 16 hypodermic needle very easily. It is pointed out that the resultant paste comprised approximately 95 percent of the metallic alloy.

EXAMPLE IV

A brazing alloy paste was made utilizing 50 ml. of 327.8 grams of powder consisting of 75 weight percent Ag-20 weight percent Pd-5 weight percent Mn. Cryolite was used as a flux and was present in the amount of 20 ml. or approximately 25 grams. The void in the dry powder was determined to be 4 ml./10 ml. in accord with the test in Example II. Using an 8.5 factor, 17 grams of the binder of Example I was added to the dry powder mix. In order to obtain a penetration of 220 mm., 14 ml. of thinner was added to the binder composition. This produced a successful flux of the invention.

EXAMPLE V

This example illustrates the utilization of the brazing alloys of the invention having the novel binder therein. The brazing alloy was formed using 2,432 grams of -200 mesh alloy of 82 weight percent gold and 18 weight percent nickel. This was mixed with 48.6 grams of -200 mesh cryolite powder which served as a flux. The 48.6 grams was chosen as 2 percent of the alloy weight. After thoroughly mixing the metal powder and flux, 264 ml. of the blended material was then weighed. This material had a void of 4 ml./10 ml. The alloy was then mixed with the binder of the invention as made per Example I. 84.5 grams of the binder was chosen utilizing an 8.0 factor as indicated in Example II. 26 ml. of a mineral spirits thinner was utilized so that a penetrometer cone penetration of 242 mm./10 was obtained. The brazing base formed was applied by a hypodermic syringe to 347 stainless steel tubes of a J-2 rocket engine thrust chamber. The thrust chamber tubes were then placed in a brazing furnace which was maintained above 1,742° F. and brazing transpired.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A brazing alloy binder comprising:
   85–91 volume percent polybutene,
   3–5 volume percent of a compound selected from the class consisting of ethylene glycol monomethyl ether and ethylene glycol,
   5–10 volume percent water, and 0.5 to 1 volume percent of a solid acrylic resin which consists of a lower copolymer of esters of acrylic and methacrylic acid.

2. The binder of claim 1 wherein said polybutenes have a viscosity at 100° F. of from 35,000 to 45,000 SSU.

References Cited

UNITED STATES PATENTS

| | | | |
|---|---|---|---|
| 3,238,133 | 3/1966 | Lorensen | 252—56 |
| 3,242,079 | 3/1966 | McMillen | 252—56 |
| 2,296,427 | 9/1942 | Daniel et al. | 260—29.6 |
| 2,356,367 | 8/1944 | Wright | 252—59 |
| 2,431,008 | 11/1947 | Wright | 252—59 |
| 3,132,104 | 5/1964 | Scherer | 260—896 |
| 3,298,591 | 1/1967 | Guminski | 252—59 |

MURRAY TILLMAN, Primary Examiner

H. ROBERTS, Assistant Examiner

U.S. Cl. X.R.

29—501; 228—50; 260—896, 897